UNITED STATES PATENT OFFICE.

MAX H. ISLER, OF MANNHEIM, GERMANY, ASSIGNOR TO THE BADISCHE ANILIN AND SODA FABRIK, OF LUDWIGSHAFEN, GERMANY.

BLUE DYE AND PROCESS OF MAKING SAME.

SPECIFICATION forming part of Letters Patent No. 617,686, dated January 10, 1899.

Application filed December 27, 1897. Serial No. 663,713. (Specimens.)

*To all whom it may concern:*

Be it known that I, MAX H. ISLER, a citizen of the Swiss Republic, residing at Mannheim, in the Grand Duchy of Baden, Empire of Germany, have invented new and useful Improvements in the Manufacture of Blue Mordant-Dyeing Coloring-Matters from Dinitro-Anthraquinones, of which the following is a specification.

In the manufacture of blue mordant-dyeing coloring-matters by the treatment of dinitro-anthraquinones with fuming sulfuric acid it is known that either the addition of sulfur to the melt or the addition under certain conditions of boracic acid to the melt will produce definite valuable results in each separate case.

I have now discovered that new mordant-dyeing coloring-matters can be obtained by the simultaneous use of sulfur and boracic acid in the fuming acid melt. These new dyestuffs possess valuable properties differing and in no way deducible from those of the coloring-matters obtained when using either of the said materials alone. The nature of the products obtained varies according to the strength of the fuming acid employed and the temperature and duration of treatment.

The following examples will serve to illustrate the manner in which my invention can best be carried into practical effect. The parts are by weight.

Example 1: Mix about ten (10) parts of 1.5 dinitro-anthraquinone, ten (10) parts of crystallized boracic acid, two (2) parts of sulfur, and one hundred to two hundred (100–200) parts of fuming sulfuric acid containing about thirty to forty per cent. (30–40%) free anhydrid, ($SO_3$.) Heat the mixture for about two to two and a half hours at a temperature of one hundred and twenty to one hundred and thirty degrees centigrade, (120°–130° C.) Dilute the melt with two thousand to three thousand (2,000–3,000) parts of water. Filter and wash till neutral with cold water. The resulting coloring-matter is but slightly soluble in cold water, but readily soluble in hot water.

If under the conditions of the above example sulfur alone had been used, a reddish-blue dyestuff soluble in water would have been obtained. By the use of boracic acid alone insoluble brown-violet coloring-matters have been produced. The new coloring-matter is entirely different from these and gives a very greenish shade of blue possessing very valuable propertities. It possesses the following characteristics: dissolves in concentrated sulfuric acid, giving a yellow solution. The solutions in ammonia, caustic soda, and anilin are blue. The alcoholic solution is blue violet, and in hydrochloric acid it dissolves, giving a brownish-yellow color. Its solubility in hot water is sufficiently great to permit of its use in piece-dyeing by the one-bath method. The shades obtained by its use are fast to fulling.

Example 2: Mix together about ten (10) parts of dinitro-anthraquinone, ten (10) parts of crystallized boracic acid, two (2) parts of sulfur, and two hundred (200) parts of fuming sulfuric acid containing about forty-five per cent. (45%) free anhydrid, ($SO_3$.) Heat the mixture for about two to two and a half hours at a temperature of one hundred and forty to one hundred and fifty degrees centigrade, (140°–150° C.) Pour the melt into water, precipitate with common salt, filter, wash, and dry. The new coloring-matter thus obtained dyes a more reddish shade of blue than the product of Example 1. It has the character of a sulfo-acid and is soluble in cold water. It dyes far purer shades than either of the coloring-matters obtained under similar condition, but by the use of either boracic acid alone or sulfur alone.

The new coloring-matter possesses the following characteristics: Its solution in concentrated sulfuric acid is bluish red; in soda, red violet; in caustic soda, blue; in ammonia, violet; in cold water, red; but in alcohol it is practically insoluble. If the temperature of treatment be further raised no essentially-different results are obtained, only at temperatures of about two hundred degrees centigrade (200° C.) and higher insoluble dyes of a dull shade are obtained.

Instead of 1.5 dinitro-anthraquinone other dinitro-anthraquinones or mixtures thereof and their partial reduction products can be used.

Now what I claim is—

1. The process for the manufacture of blue coloring-matters by treating dinitro-anthraquinones with fuming sulfuric acid containing about thirty to forty per cent. $SO_3$ and boracic acid in presence of a reducing agent at a temperature of about 120° to 130° centigrade for two to two and a half hours substantially as hereinbefore described.

2. The new blue coloring-matter which can be obtained by treating 1.5 dinitro-anthraquinone with fuming sulfuric acid containing about thirty to forty per cent. $SO_3$ and boracic acid in presence of sulfur at a temperature of about 120° to 130° centigrade for about two to two and a half hours and which gives with concentrated sulfuric acid a yellow color, with ammonia, caustic soda and anilin a blue color, with alcohol a blue-violet color and with hydrochloric acid a brownish-yellow color all substantially as hereinbefore described.

In testimony whereof I have hereunto set my hand in the presence of two subscribing witnesses.

MAX H. ISLER.

Witnesses:
GUSTAV L. LICHTENBERGER,
BERNHARD C. HESSE.